US009247037B2

(12) United States Patent  
Clark et al.

(10) Patent No.: US 9,247,037 B2
(45) Date of Patent: Jan. 26, 2016

(54) METHODS AND SYSTEMS FOR TOUCH-FREE CALL ORIGINATION

(75) Inventors: David William Clark, Carp (CA); Andrew James Weber, Ottawa (CA)

(73) Assignee: BCE INC., Verdun (CA)

( * ) Notice: Subject to any disclaimer, the term of this patent is extended or adjusted under 35 U.S.C. 154(b) by 1987 days.

(21) Appl. No.: 11/534,501

(22) Filed: Sep. 22, 2006

(65) Prior Publication Data

US 2007/0073536 A1 Mar. 29, 2007

Related U.S. Application Data

(63) Continuation of application No. PCT/CA2005/001456, filed on Sep. 23, 2005.

(51) Int. Cl.
*H04M 1/27* (2006.01)
*G10L 15/26* (2006.01)

(52) U.S. Cl.
CPC .............. *H04M 1/271* (2013.01); *G10L 15/26* (2013.01); *H04M 2250/74* (2013.01)

(58) Field of Classification Search
CPC .... H04M 1/27; H04M 1/271; H04M 2250/74
USPC ................... 379/212.01, 88.01–88.03, 88.17; 455/563, 417
See application file for complete search history.

(56) References Cited

U.S. PATENT DOCUMENTS

| 6,021,177 | A | 2/2000 | Allport |
| 6,101,473 | A | 8/2000 | Scott et al. |
| 6,160,877 | A | 12/2000 | Tatchell et al. |
| 6,212,408 | B1 * | 4/2001 | Son et al. .................. 455/563 |
| 6,438,216 | B1 | 8/2002 | Aktas |
| 6,505,163 | B1 | 1/2003 | Zhang et al. |
| 6,584,188 | B2 | 6/2003 | Kim |
| 6,631,179 | B1 | 10/2003 | Sifuentes |

(Continued)

FOREIGN PATENT DOCUMENTS

| JP | 2001339504 A | 12/2001 |
| WO | WO 01/35620 A1 | 5/2001 |

OTHER PUBLICATIONS

Office Action mailed on Dec. 21, 2009 in connection with Canadian Patent Application 2,570,695.

(Continued)

*Primary Examiner* — MD S Elahee
(74) *Attorney, Agent, or Firm* — Gowling Lafleur Henderson, LLP (57) ABSTRACT

Methods and systems to enable touch-free call origination using a communication device equipped with a microphone. The method comprises processing a first microphone signal at the device in an attempt to detect a spoken activation command potentially contained therein. Responsive to detection of a spoken activation command in the first microphone signal, the method continues by establishing a communication path between the device and a network entity to convey to the network entity a second microphone signal. Finally, the method comprises processing the second microphone signal at the network entity in an attempt to detect a call origination command potentially contained therein; and, responsive to detection of a call origination command in the second microphone signal, attempting establishment of a call in accordance with the detected call origination command. Thus, a call can be established without tactile interaction with the device and, moreover, with minimal computational load on the device.

53 Claims, 9 Drawing Sheets

(56) References Cited

U.S. PATENT DOCUMENTS

| | | | |
|---|---|---|---|
| 6,633,846 B1 | 10/2003 | Bennett et al. | |
| 6,728,671 B1 | 4/2004 | Johnson | |
| 6,799,098 B2 | 9/2004 | Horst et al. | |
| 7,120,241 B1* | 10/2006 | Fuoss et al. | 379/212.01 |
| 7,356,131 B2* | 4/2008 | Bishop et al. | 379/88.03 |
| 7,437,148 B1* | 10/2008 | Vaghi et al. | 455/417 |
| 2002/0067245 A1 | 6/2002 | Campbell et al. | |
| 2002/0168063 A1 | 11/2002 | Williams | |
| 2002/0193989 A1 | 12/2002 | Geilhufe et al. | |
| 2004/0066916 A1 | 4/2004 | Brown et al. | |
| 2004/0141597 A1* | 7/2004 | Giacomelli | 379/88.17 |
| 2010/0215039 A1 | 8/2010 | Kent et al. | |

OTHER PUBLICATIONS

PCT/CA2005/001456 (ISR), Jun. 1, 2006, BCE Inc.
PCT/CA2005/001457 (ISR), Jun. 29, 2006, BCE Inc.
PCT/CA2005/001942 (ISR), Jun. 29, 2006, BCE Inc.
Onstar, How Do I Use OnStar?, http://www.onstar.com/canada_english/jsp/explore/use_onstar.jsp, 2 pages.
Mobiletrax, Voice activated Services in Cell Phones: "Can You Understand Me Now?", Dec. 15, 2004, http://www.mobiletrax.com/im/2004archives/20041215.html, 3 pages.
Cartronics Inc., Verison Wireless, Keeping It Simple with the Kyocera KX444 PTT Phone, http://www.cartron.com/kyo_kx444.pdf, 5 pages.
Office Action issued by the United States Patent and Trademark Office on Dec. 10, 2010 in connection with U.S. Appl. No. 11/534,425, 19 pages.
Office Action issued by the United States Patent and Trademark Office on Dec. 9, 2010 in connection with U.S. Appl. No. 11/534,414, 17 pages.
Office Action issued on Jan. 17, 2012 in connection with U.S. Appl. No. 11/534,414, 15 pages.
Final Office Action on issued Jun. 19, 2012 in connection with U.S. Appl. No. 11/534,425, 18 pages.
Office Action issued on Jan. 20, 2012 in connection with U.S. Appl. No. 11/534,425, 17 pages.

* cited by examiner

METHODS AND SYSTEMS FOR TOUCH-FREE CALL ORIGINATION

CROSS-REFERENCE TO RELATED APPLICATION

This application is a CONTINUATION of PCT International Patent Application Serial No. PCT/CA2005/001456, filed on Sep. 23, 2005, designating the United States of America, and hereby incorporated by reference herein.

FIELD OF THE INVENTION

The present invention relates generally to telephone communication and, more specifically, to methods and systems for enabling a user of a communication device to originate a call without touching the communication device.

BACKGROUND OF THE INVENTION

As users of telephony services become increasingly mobile, certain elements of their environment have unfortunately not adapted to the specific needs brought on by this increased mobility. For example, mobile users are still constrained to touch or otherwise physically handle a telephone when originating a call. Although in some instances voice recognition can be used to recognize dialing commands, it remains the case that an initial tactile interaction (usually pressing a button) is required to activate the phone and place it into a mode in which dialing commands can subsequently be detected and responded to.

For users who wear wireless headsets, this limitation poses an inconvenience, as the very purpose of wearing a headset is to keep one's hands free, which is not possible when the headset or phone base must be physically manipulated in order to originate a call. Similarly, drivers wishing to originate a call must liberate at least one hand from the steering wheel or stick shift while activating their phones, even if voice recognition is used to recognize a subsequent dialing command. This brief moment of distraction poses a safety hazard.

Thus, an improvement is needed which would enable a user of a communication device who wishes to originate a call to do so without touching the communication device.

SUMMARY OF THE INVENTION

A first broad aspect of the present invention seeks to provide a method to enable touch-free call origination using a communication device equipped with a microphone. The method comprises processing a first microphone signal at the communication device in an attempt to detect a spoken activation command potentially contained therein. Responsive to detection of a spoken activation command in the first microphone signal, the method continues by establishing a communication path between the communication device and a network entity to convey to the network entity a second microphone signal. Finally, the method comprises processing the second microphone signal at the network entity in an attempt to detect a call origination command potentially contained therein; and, responsive to detection of a call origination command in the second microphone signal, attempting establishment of a call in accordance with the detected call origination command.

A second broad aspect of the present invention seeks to provide a call origination unit for enabling touch-free call origination from a communication device. The call origination unit comprises a communication module adapted to support a communication path conveying an origination signal produced by a microphone associated with the communication device, the communication path being established in response to detection by the communication device of a spoken activation command in an activation signal produced by the microphone. The call origination unit also comprises a speech recognition module adapted to process the origination signal conveyed over the communication path in an attempt to detect a call origination command potentially contained therein. Finally, the call origination unit comprises a control module responsive to detection of a call origination command by the speech recognition module to attempt establishment of a call in accordance with the detected call origination command.

A third broad aspect of the present invention seeks to provide a call origination unit for a computer readable storage medium containing a program element for execution by a call origination unit to enable touch-free call origination from a communication device. The program element includes program code means for supporting a communication path conveying an origination signal produced by a microphone associated with the communication device, the communication path being established in response to detection of a spoken activation command in an activation signal produced by the microphone. The program element also includes program code means for processing the origination signal in an attempt to detect a call origination command potentially contained therein. Finally, the program element includes program code means for, in response to detection of a call origination command, attempting establishment of a call in accordance with the detected call origination command.

A fourth broad aspect of the present invention seeks to provide a communication device for enabling touch-free call origination. The communication device comprises a microphone adapted to produce microphone signals indicative of sound sensed by the microphone. The communication device also comprises a speech recognition module adapted to process a first microphone signal in an attempt to detect a spoken activation command potentially contained therein. Finally, the communication device comprises a communication module adapted to establish over a portion of a communication network a communication path with a call origination unit in response to detection of a spoken activation command by the speech recognition module, the communication path conveying a second microphone signal. It is noted that when the second microphone signal conveys a call origination command detectable by a second speech recognition module in the call origination unit, the call origination unit is caused to attempt establishment of a call in accordance with the call origination command.

A fifth broad aspect of the present invention seeks to provide a system for touch-free call origination. The system comprises a communication device and a call origination unit reachable by the communication device via a portion of a communication network. The communication device comprises a microphone adapted to produce microphone signals indicative of sound sensed by the microphone, as well as a first speech recognition module adapted to process a first microphone signal in an attempt to detect a spoken activation command potentially contained therein. The communication device also comprises a communication module adapted to convey a second microphone signal over a communication path established with the call origination unit in response to detection of a spoken activation command by the first speech recognition module. For its part, the call origination unit comprises a second speech recognition module adapted to process the second microphone signal in an attempt to detect a call origination command potentially contained therein. Finally, the call origination unit comprises a control module responsive to detection of a call origination command by the second speech recognition module to attempt establishment of a call in accordance with the detected call origination command.

These and other aspects and features of the present invention will now become apparent to those of ordinary skill in the art upon review of the following description of specific embodiments of the invention in conjunction with the accompanying drawings.

It is to be expressly understood that the description and drawings are only for the purpose of illustration of certain embodiments of the invention and are an aid for understanding. They are not intended to be a definition of the limits of the invention.

DETAILED DESCRIPTION OF EMBODIMENTS

Figure 1:
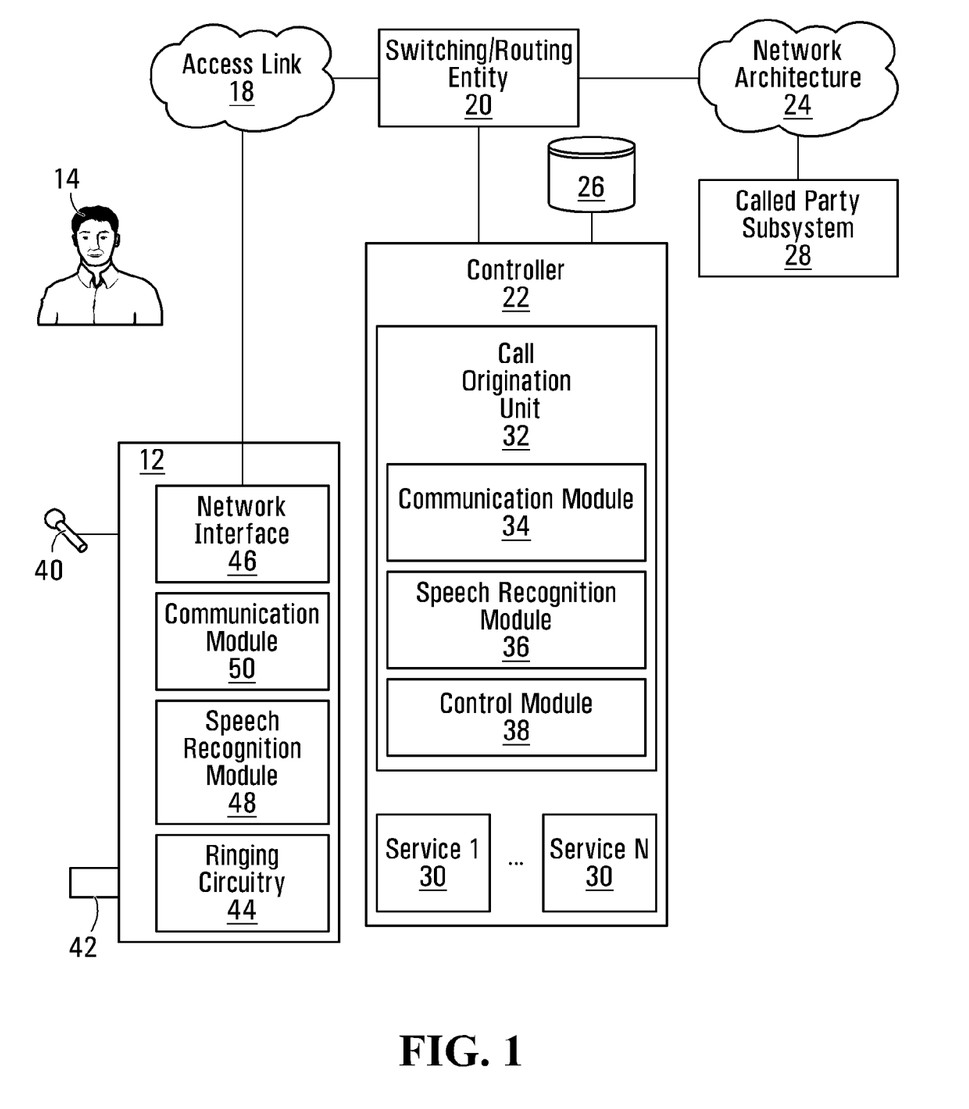
FIG. 1 shows, in schematic form, a communication device, a controller, a database and other components of a system for enabling a user of the communication device to originate a call without touching the communication device, in accordance with an embodiment of the present invention.

Reference is made to FIG. 1, which depicts a communication device 12 that may be employed by a user 14 to effect various call origination and call answering activities, including but not limited to placing a telephone call to a called party device, dialing-in to a server to check the user's voice mail messages and answering an incoming call. By way of several non-limiting examples, the communication device 12 may be a wired POTS phone (including a cordless phone), a wireless phone (e.g., a cellular or other mobile device including a telephony-enabled personal digital assistant), a VoIP phone, or a soft phone (i.e., a computer equipped with a software application for telephony).

In accordance with a specific non-limiting embodiment of the present invention, the communication device 12 comprises a microphone 40, a loudspeaker or earphone 42, ringing circuitry 44, a network interface 46 and a set of functional modules including a speech recognition module 48 and a communication module 50. Standard dialing circuitry (not shown) may also be provided to handle circumstances where the user 14 desires to effect a call origination activity without using the touch-free approach described herein.

The microphone 40, the loudspeaker or earphone 42, the ringing circuitry 44 and the network interface 46 are conventionally available components and, as such, need not be described any further. For their part, the speech recognition module 48 and the communication module 50 can be implemented in hardware, software, firmware, control logic or a combination thereof. The functionality of the speech recognition module 48 and the communication module 50 will be described in further detail later on.

Continuing with the description of FIG. 1, the communication device 12 is connected to a switching/routing entity 20 via an access link 18. The access link 18 may include a collection of physical connections running through a portion of a communication network. The nature of the access link 18 and the switching/routing entity 20 will depend on the nature of the communication device 12, as now described.

For example, where the communication device 12 is a wired POTS phone, the access link 18 may be a twisted pair and the switching/routing entity 20 may be a central office switch. Where the communication device 12 is a wireless phone, the access link 18 may comprise a wireless link in combination with a base station and a network-side wireline link, and the switching/routing entity 20 may be embodied as a mobile switching center. Where the communication device 12 is a VoIP phone (or a POTS phone equipped with an analog terminal adapter—ATA), the access link 18 may be a digital communications link such as Ethernet and the switching/routing entity 20 may be an edge router. Alternatively, where the communication device 12 is a soft phone, the access link 18 may be a digital communications link such as a DSL link, coaxial cable, etc., and the switching/routing entity 20 may be a server equipped with a modem. Still other configurations will be apparent to those skilled in the art.

The switching/routing entity 20 is connected to a controller 22 and to a network architecture 24, which allows the communication device 12 to reach a called party subsystem 28. In one non-limiting example scenario, the called party subsystem 28 may be a telephone (wired POTS, wireless, VoIP or otherwise). In another non-limiting example scenario, the called party subsystem 28 may be a voice mail system. In yet another non-limiting example scenario, the called party subsystem 28 may actually be the controller 22 (e.g., when the user 14 wishes to perform administration of his/her account). Thus, the network architecture 24 encompasses a broad range of possibilities, including a collection of zero, one, two or more networks needed to be traversed from the switching/routing entity 20 to the called party subsystem 28.

The switching/routing unit 20 is capable of effecting switching operations to help route an outbound call from the communication device 12 towards the called party subsystem 28 via the network architecture 24. In addition, the switching/routing unit 20 is capable of effecting switching operations to complete an inbound call arriving from the network architecture 24 that is destined for the communication device 12. Furthermore, the switching/routing unit 20 is capable of effecting switching operations to provide a communication path between the controller 22 and the communication device 12 during call origination or while a call is in progress.

In one specific non-limiting embodiment, the controller 22 may be located in a network entity that also houses the switching/routing entity 20, whereas in another specific non-limiting embodiment, the controller 22 may be located in a network entity that is different from that which houses the switching/routing entity 20. The controller 22 is connected to a database 26, which is now described in further detail with reference to FIG. 5A.

Figure 5A:
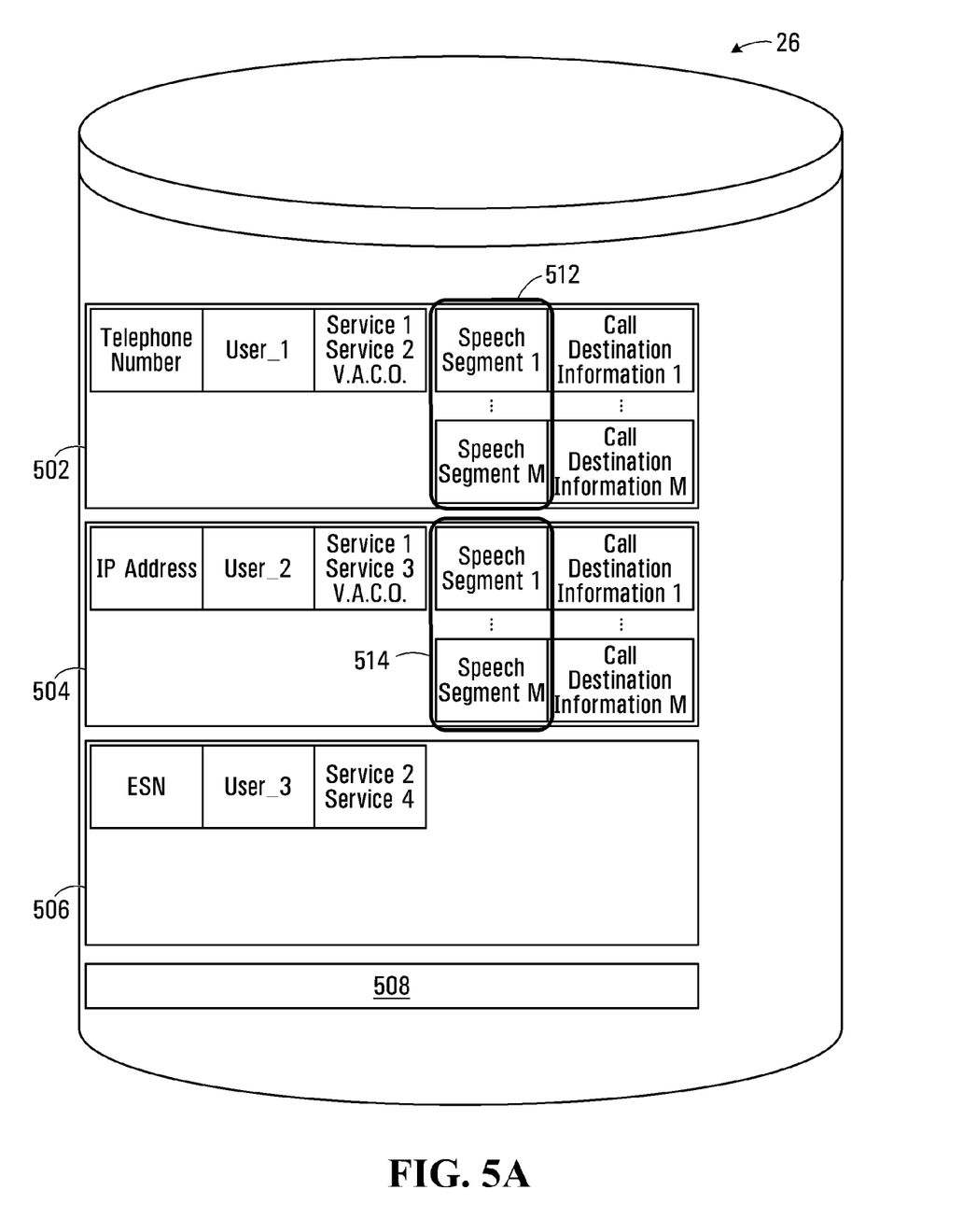
FIG. 5A conceptually illustrates potential contents of the database in FIG. 1, in accordance with an embodiment of the present invention.

Specifically, the database 26 stores information on various users (such as the user 14) as well as the communication services to which these users may be subscribed. Examples of conventionally available communication services for outbound calls include long distance call blocking, calling line identification (CLID) blocking and so on. For inbound calls, examples of conventionally available services include call forwarding, calling line identification (CLID), and so on. In addition, and in accordance with a non-limiting embodiment of the present invention, the database 26 stores information on whether a particular user is subscribed to a "voice-activated call origination" service.

By way of non-limiting example, the database 26 maintains a set of records 502, 504, 506 associated with respective users USER_1, USER_2, USER_3, as well as a plurality of other similar records 508 associated with other respective users. Each record may optionally also include information regarding a telephone number, IP address or electronic serial number (ESN) associated with the respective user. For example, record 502 contains information regarding a telephone number from which the associated user, USER_1, is expected to dial using a wired POTS phone. Record 504 contains information regarding an IP address from which the associated user, USER_2, is expected to dial using a VoIP phone. Record 506 contains information regarding an electronic serial number (ESN) from which the associated user, USER_3, is expected to place calls.

In addition, each of the records 502, 504, 506, 508 includes a list of communication services to which the respective user is subscribed. In this specific non-limiting example, the user identified in record 502, namely USER_1, subscribes to "Service 1", "Service 2" and the voice-activated call origination (V.A.C.O.) service contemplated by the present invention. Also in this specific non-limiting example, the user identified in record 504, namely USER_2, subscribes to "Service 1", "Service 3" and the V.A.C.O. service contemplated herein. However, the user identified in record 506, namely USER_3, subscribes only to "Service 2" and "Service 4", and does not subscribe to the V.A.C.O. service contemplated herein.

Returning now to FIG. 1, the controller 22 comprises a set of functional units for managing the aforementioned services and potentially other services relating to the communication device 12 and to other communication devices. Functional units associated with conventionally available services 1 through N are denoted by the numeral 30. In addition, there is provided a functional unit 32 associated with the voice-activated call origination service mentioned above. For ease of reference, the functional unit 32 will hereinafter be referred to as a "call origination unit" 32.

In accordance with a specific non-limiting embodiment of the present invention, the call origination unit 32 comprises a set of functional modules, including a communication module 34, a speech recognition module 36 and a control module 38. The communication module 34, the speech recognition module 36 and the control module 38 can be implemented in hardware, software, firmware, control logic or a combination thereof. The functionality of the communication module 34, the speech recognition module 36 and the control module 38 will be described in further detail below.

Specifically, operation of, and interaction among, the speech recognition module 48, the communication module 50, the communication module 34, the speech recognition module 36 and the control module 38 are now described in the context of an example illustrating how touch-free call origination activities can be effected using the communication device 12. Accordingly, reference is made to FIGS. 2A, 2B, 3A and 3B.

Figure 2A:
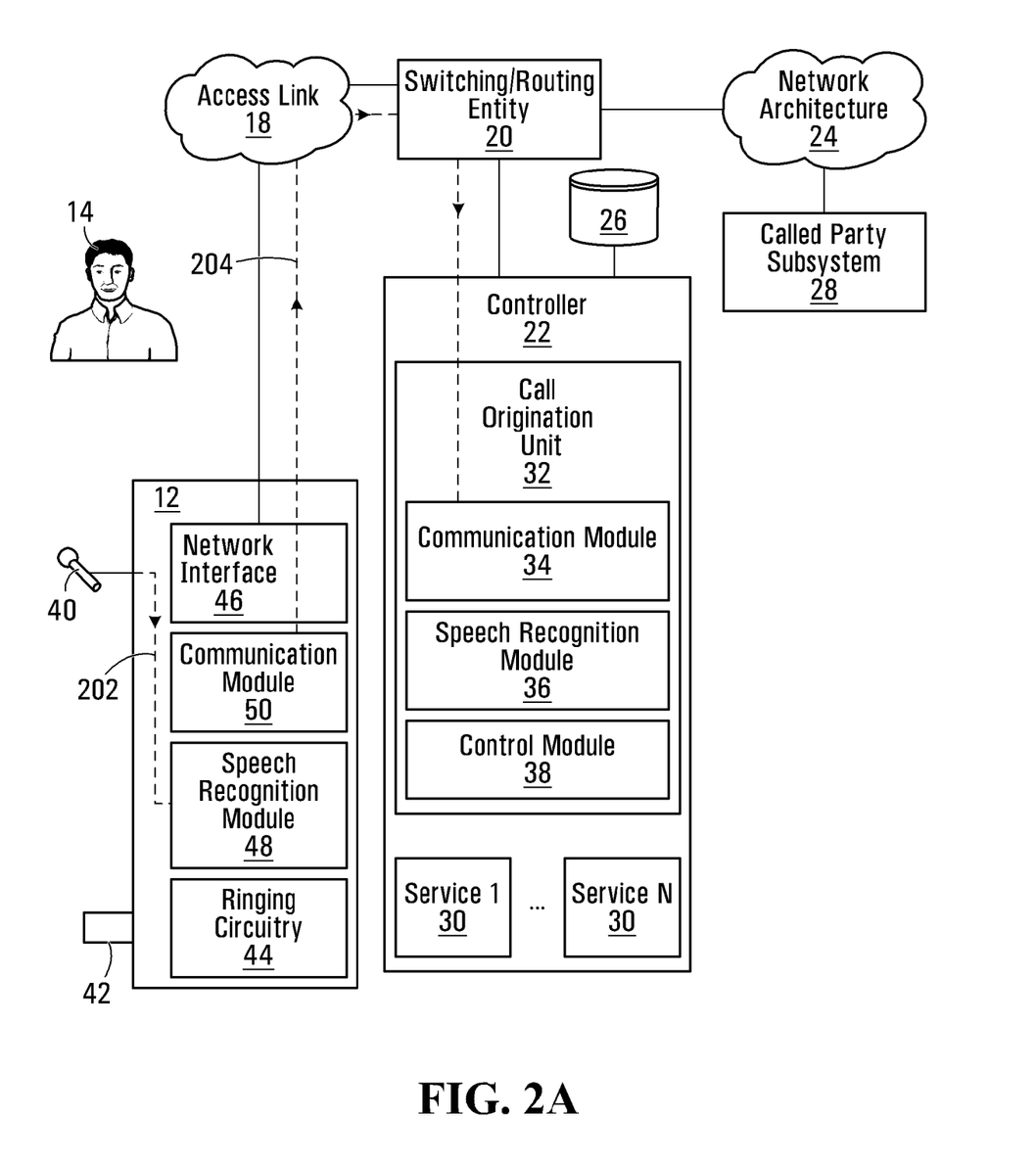
FIGS. 2A and 2B are signal flow diagrams showing interaction of various components in the system of FIG. 1 during a touch-free call origination process.
Figure 3A:
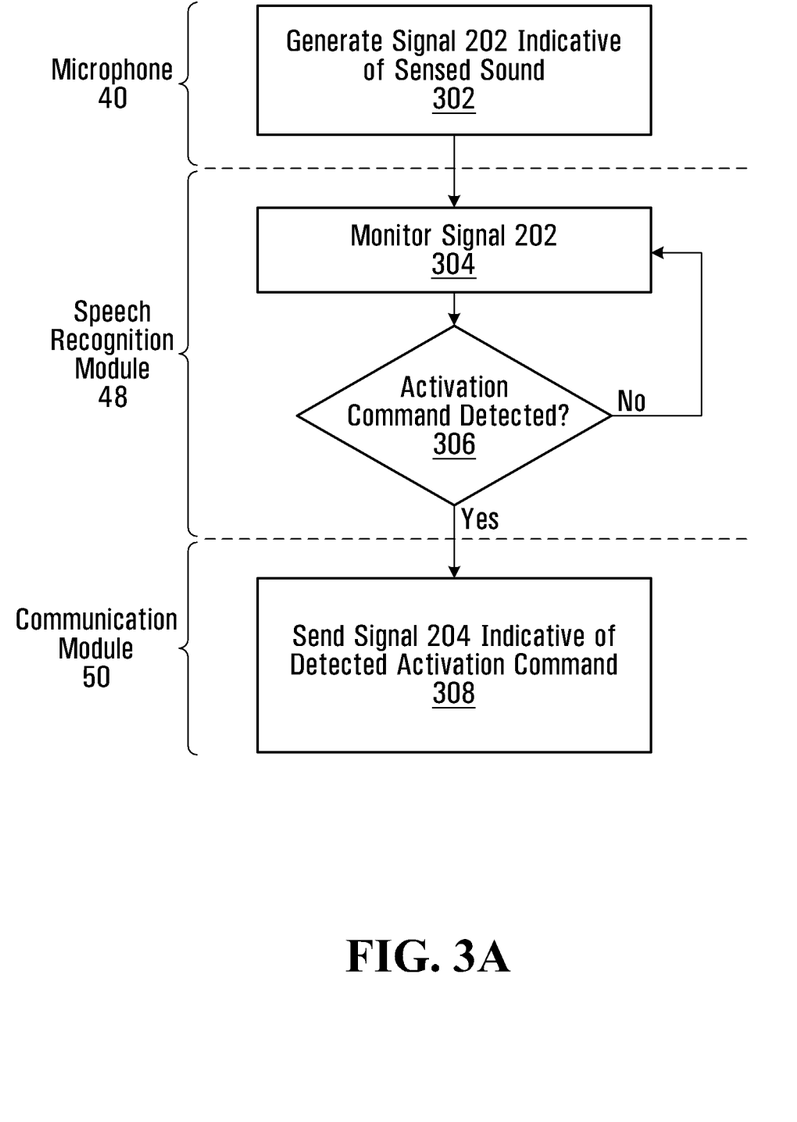
FIGS. 3A and 3B are flowcharts showing steps in the operation of the communication device in the context of the signal flow diagrams of FIGS. 2A and 2B, respectively.

Step 302
    The microphone 40 in the communication device 12 continually produces a signal 202 indicative of sound sensed in the vicinity of the communication device 12. The signal 202 is fed to the speech recognition module 48. In accordance with an embodiment of the present invention, in order for touch-free call origination to be effected, the user 14 is required to utter a "detectable" activation command in order to "wake up" the communication device 12. By "detectable" is meant an activation command that can be detected by the speech recognition module 48, which may or may not involve having previously undergone a speech recognition training session with the user 14.

An example of a detectable activation command may be the spoken utterance "phone on" or some other utterance that is not expected to be used regularly during ordinary conversation in the vicinity of the communication device 12.

Step 304
    The speech recognition module 48 monitors the signal 202 from the microphone 40 and processes it in an attempt to detect therein one of the detectable activation commands.

Step 306
    In the absence of detection of a detectable activation command, i.e., the "NO" branch of step 306, the speech recognition module 48 returns to step 304 and continues its monitoring process. However, assuming that the user 14 does indeed utter (with sufficient volume) a specific activation command that is in fact a detectable activation command, this specific activation command will be contained in the signal 202 that was produced by the microphone 40 and hence will be detected by the speech recognition module 48. As a result, the "YES" branch of step 306 is taken and the communication module 50 proceeds to execute step 308.

Step 308
    The speech recognition module 48 provides a signal 204 indicative of the specific activation command is provided to the call origination unit 32 in the controller 22, specifically to the communication module 34 in the call origination unit 32, using a protocol such as SS7 (Signaling System 7), SIP (Session Initiation Protocol), etc., depending on the nature of the communication device 12 and the access link 18.

Figure 3B:
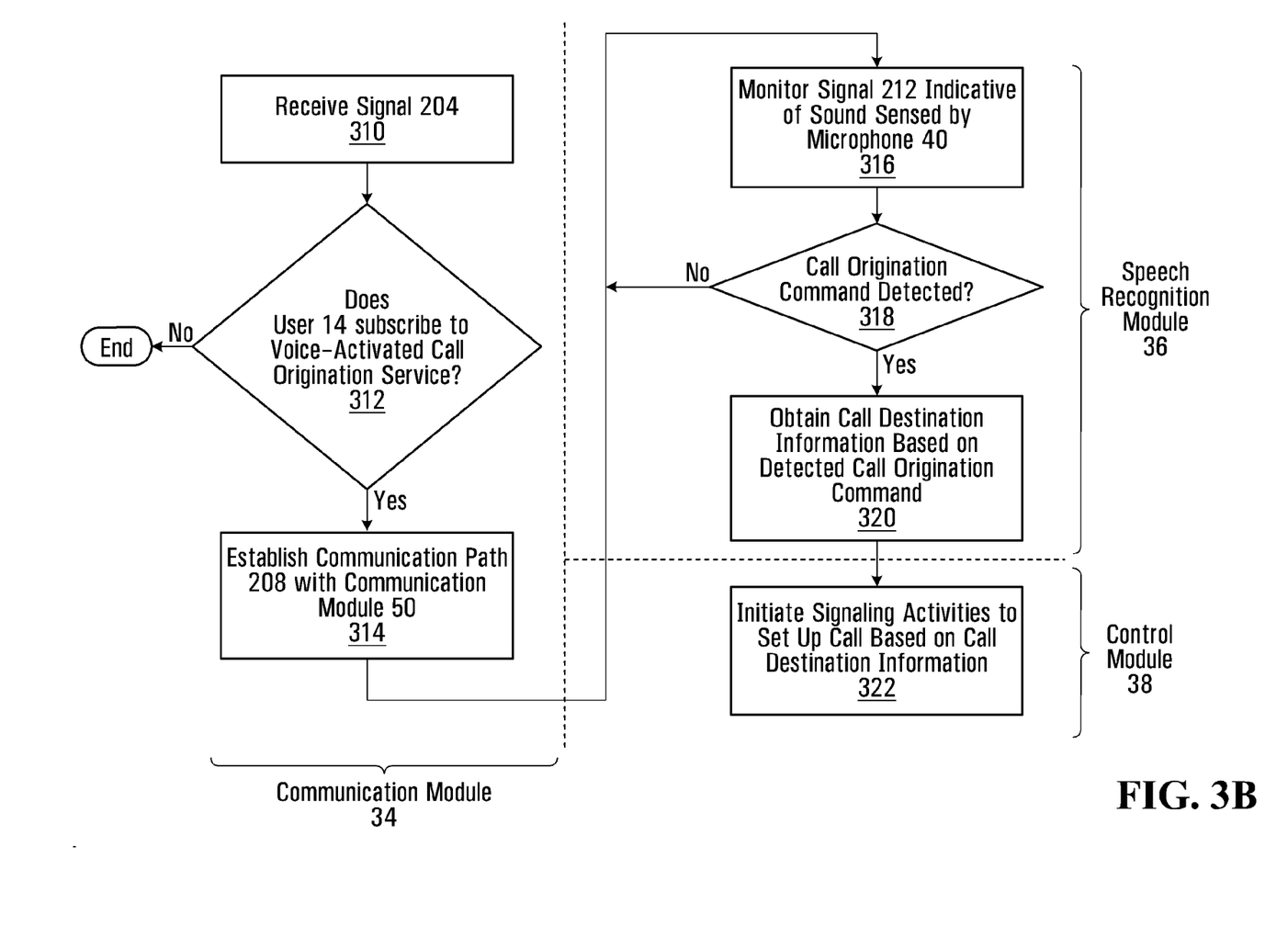

Step 310
    The signal 204 is received at the communication module 34 but the user's eligibility to effect a touch-less call origination activity is still unknown.

Step 312
    The communication module 34 consults the database 26 to determine whether the user 14 subscribes to the voice-activated call origination service. The identity of the user 14 can be learned in various ways, e.g., by mapping to the user 14 either the telephone number of the residence at which the communication device 12 is located (for a wired POTS phone), or an IP address of the communication device 12 (for a VoIP phone), or an ESN of the communication device 12 (for a wireless phone), etc.

If it is determined that the user 14 does not subscribe to the voice-activated call origination service, no further action is taken. On the other hand, it is determined that the user 14 does subscribe to the voice-activated call origination service (i.e., the user 14 is an eligible user of the V.A.C.O. service), then the communication module 34 in the call origination unit 32 proceeds to step 314.

Figure 2B:
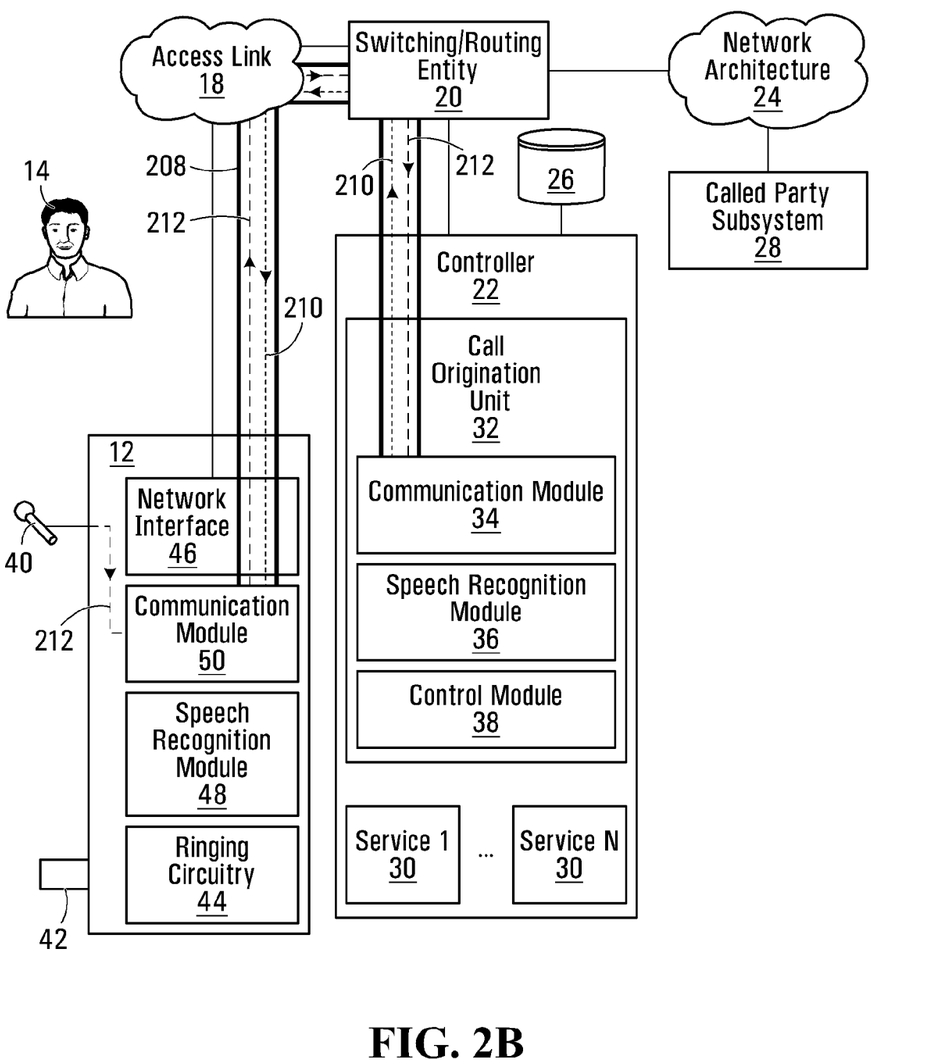

Step 314
    The communication module 34 in the call origination unit 32 and the communication module 50 in the communication device 12 establish a communication path 208 between themselves. Establishment of the communication path 208 can be done using a protocol such as SS7, SIP, etc., depending on the nature of the communication device 12 and the access link 18.

At this point, the communication module 34 knows that an eligible user (in this case the user 14) is accessing the voice-activated call origination service and therefore likely desires to effect a call origination activity. In some embodiments, the specific activation command uttered by the user 14 may already contain an indication of the nature of the call origination activity (such as placing a call, accessing a voice mail server), while in other cases it may only serve to activate the communication device 12.

In some cases, it may be advantageous to positively confirm the user's desire to effect a call origination activity. Thus, optionally, the communication module 34 may send a confirmation signal 210 to the communication module 50 over the communication path 208. The confirmation signal 210 may contain either a confirmation request message or a command to emit a confirmation request message stored locally by the communication device 12.

Upon receipt of the confirmation signal 210 at the communication module 50, the loudspeaker 42 is caused to emit the confirmation request message.

If the user 14 is not satisfied with having triggered the voice-activated call origination service, the user 14 can hang up or can issue a negative confirmation response utterance. The end result may be disablement of the communication path 208. The details of how to implement a suitable tear-down procedure will be understood by a person skilled in the art and therefore a more comprehensive explanation is not required.

Assuming, however, that the communication module 34 in the call origination unit 32 has reason to believe that the user 14 wishes to continue with the voice-activated call origination service (e.g., by the user 14 having responded positively to the confirmation request message, or by not having responded to the confirmation request message, or in the absence of a confirmation request message altogether), the communication path 208 is kept alive and will convey the signal that is currently being produced by the microphone 40. However, to avoid confusion with the previous signal 202 that contained the specific activation command, the signal that is currently being produced by the microphone 40 is denoted by the reference numeral 212.

Step 316

The speech recognition module 36 monitors the signal 212 from the microphone 40 in an attempt to detect therein a call origination command.

One example of a call origination command capable of being detected by the speech recognition module 36 is call destination information (e.g., a telephone number) uttered by the user 14. The call destination information may be detected using speaker-dependent or speaker-independent software in the speech recognition module 36. In one embodiment, the software compares each segment of speech to a plurality (in this case a total of M) of recognizable speech segments such as various enunciations of the digits "zero", "one", "two", etc.

Another example of a call origination command capable of being detected by the speech recognition module 36 is a recipient identifier (e.g., "John Smith", "voice mail") uttered by the user 14. The recipient identifier is detected using software in the speech recognition module 36. In a first variant, the speech recognition module 36 may have undergone a prior training session with the user 14.

Accordingly, as shown in FIG. 5A, the database 26 may store respective sets of recipient identifier speech segments 512, 514 for each record 502, 504. (It is recalled that in the current example, USER_3 does not subscribe to the voice-activated call origination service contemplated herein and therefore is not associated with any speech segments.) In a second variant, the speech recognition module 36 will not have undergone a prior training session with the user 14. Accordingly, the database 26 does not store any recipient identifier speech segments but instead the speech recognition module 36 converts the recipient identifier into a text string that is compared against a database of potential called parties (not shown).

The recipient identifier speech segments 512, 514 are each associated with respective call destination information (e.g., a telephone number) that allows proper routing of the call towards its destination, as if the user 14 had himself or herself submitted the call destination information.

Step 318

In the absence of detection of a call origination command, i.e., the "NO" branch of step 318, the speech recognition module returns to step 316 and continues its monitoring process (until a time out, not shown). Assuming, however, that the user 14 does indeed utter (with sufficient volume) a specific call origination command capable of being detected by the speech recognition module 36, this specific call origination command will be contained in the signal 212 that is produced by the microphone 40 and hence will be detected by the speech recognition module 36, i.e., the "YES" branch of step 318 is taken towards step 320.

Step 320

The speech recognition module 36 consults the database 26 to extract the call destination information corresponding to the specific call origination command. It is recalled that the call destination information can be obtained (1) directly from the user's utterance; (2) indirectly by consulting the database 26 based on a recipient identifier extracted from the user's utterance; or (3) indirectly by consulting the database of potential called parties (not shown) after converting a recipient identifier extracted from the user's utterance into a text string.

Optionally, it may be advantageous to positively confirm with the user 14 the correctness of the call destination information and/or the recipient identifier. Thus, the communication module 34 may send a confirmation signal (not shown) to the communication module 50 over the communication path 208. The confirmation signal may contain a confirmation request message containing the call destination information and/or the recipient identifier. Upon receipt of the confirmation signal at the communication module 50, the loudspeaker 42 is caused to emit the confirmation request message. In a non-limiting example where the call destination information is <555-555-5555>, the confirmation request message may resemble "You have chosen to dial <555-555-5555>; please confirm your intent to proceed.", or any conceivable variant thereof.

If the user 14 is satisfied with the confirmation request message, the user 14 can utter a positive confirmation response, which allows the call origination process continues with step 322. However, if the user 14 is not satisfied with the confirmation request message, the user 14 can utter a negative confirmation response, in response to which the communication module 34 may solicit the user 14 to provide an alternate call origination command, in which case the call origination process returns to step 316 above. In an alternative embodiment, or after a time-out period with no confirmation response, the communication module 34 can cause the communication path 208 to be disabled. The details of how to implement a suitable tear-down procedure will be understood by a person skilled in the art and therefore a more comprehensive explanation is not required.

Step 322

The control module 38 initiates signaling activities to set up the call based on the call destination information. For example, responsive to receipt of a telephone number of the called party subsystem 28, the control module 38 exerts control over the switching/routing unit 20 and initiates signaling activities with the network architecture 24 in order to set up the call as if the telephone number corresponding to the called party subsystem 28 had been dialed by the user 14. Of course, the call may succeed or fail depending on various factors such as congestion in the network architecture 24, availability of the called party subsystem 28, etc.

Alternatively, when the called party subsystem 28 is the controller 22, then there is no telephone number in question and the call is set up directly with the communication module 34. This latter example may be useful to permit the user 14 to change settings relating to the V.A.C.O. service.

From the above, it can be seen how the various modules in the communication device 12 and the call origination unit 32 cooperate to enable entirely touch-free call origination. Advantageously, the user 14 can originate a call without the need to press any buttons, or make any keystrokes, penstrokes, mouse clicks or contact with a touch screen.

The reader may also recognize that it may become advantageous to exploit the fact that the user 14 does not physically interact with the communication device 12, for the purposes of enhancing security.

Accordingly, in a first enhanced security variant of the above-described embodiments, it is assumed that the user's eligibility to access the voice-activated call origination service is established solely on the basis of the user's identity, regardless of the telephone number, IP address or ESN associated with the communication device 12.

Figure 4A:
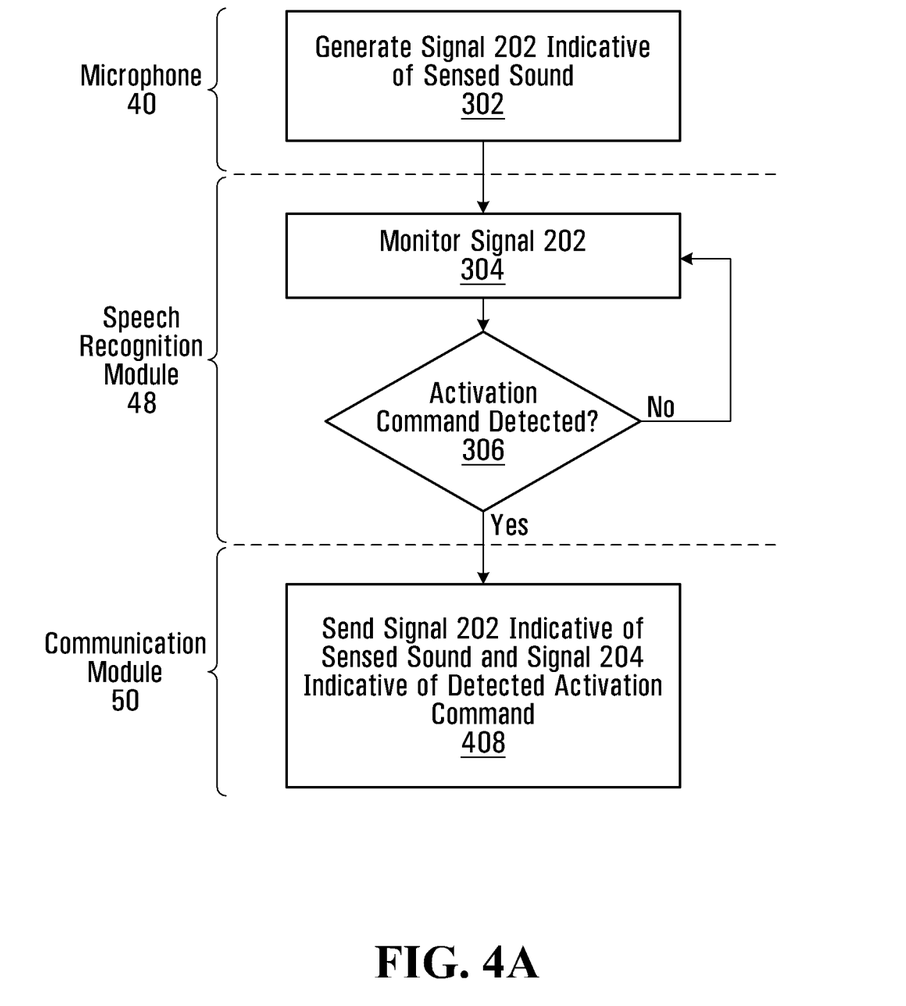
FIGS. 4A and 4B are variants of FIGS. 3A and 3B, respectively.

In such a scenario, former step 308 in FIG. 3A (in which the signal 204 indicative of a specific activation command was provided to the communication module 34 in the call origination unit 32) is replaced by step 408 in FIG. 4A, in which both the signal 202 that contains the specific activation command and the signal 204 indicative of the specific activation command are forwarded to the communication module 34 in the call origination unit 32.

Figure 4B:
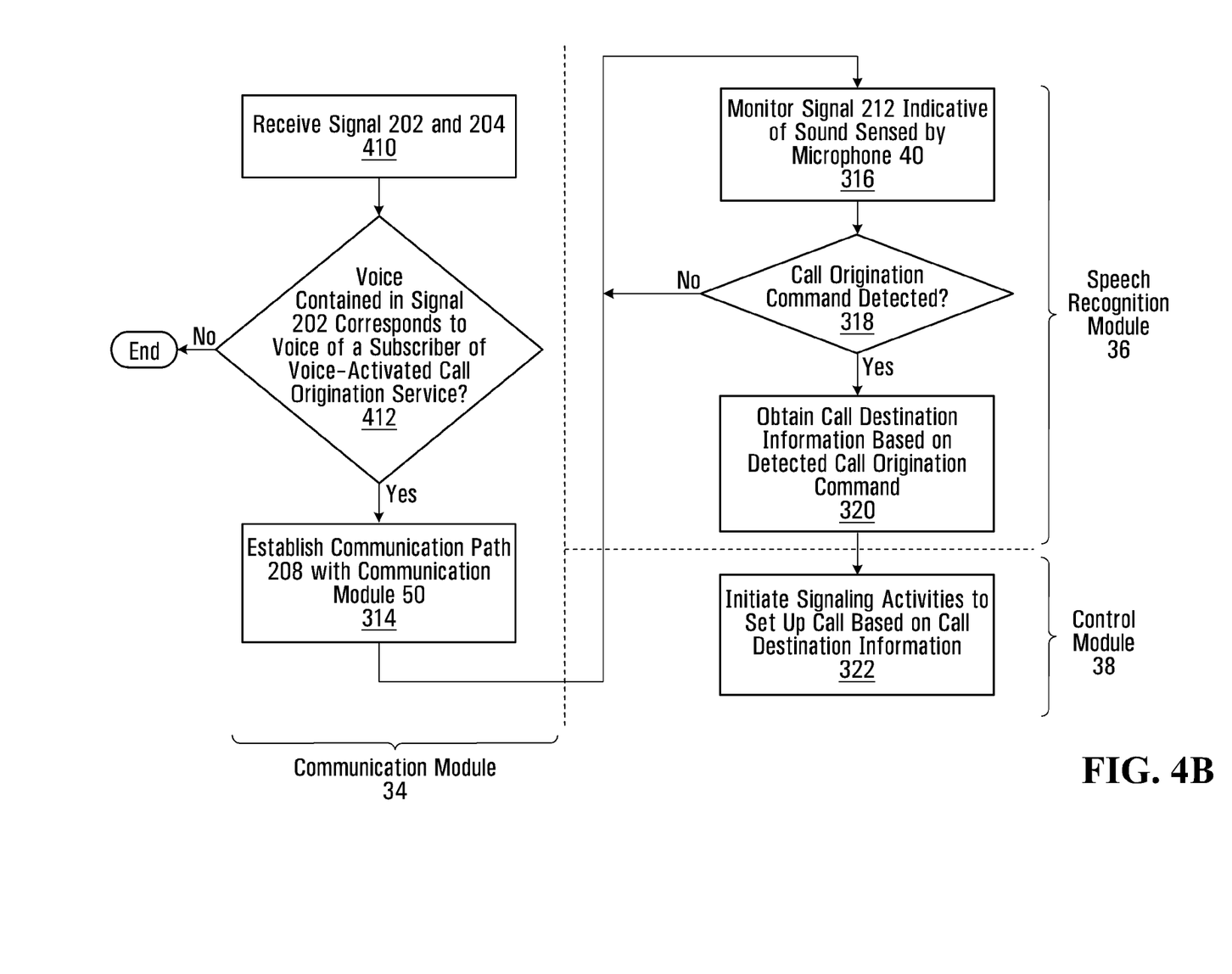

Also, former step 312 in FIG. 3B (in which the communication module 34 consults the database 26 to determine whether the user 14 subscribes to the voice-activated call origination service) is replaced by step 412 in FIG. 4B, in which the speech recognition module 36 effects a biometric signal processing operation to verify whether the user's voice as contained in the signal 202 (received at new step 410) presents characteristics of one of the users that subscribes to the voice-activated call origination service. Thus, it can be said that the speech recognition module 36 performs biometric signal processing to authenticate the user 14.

Figure 5B:
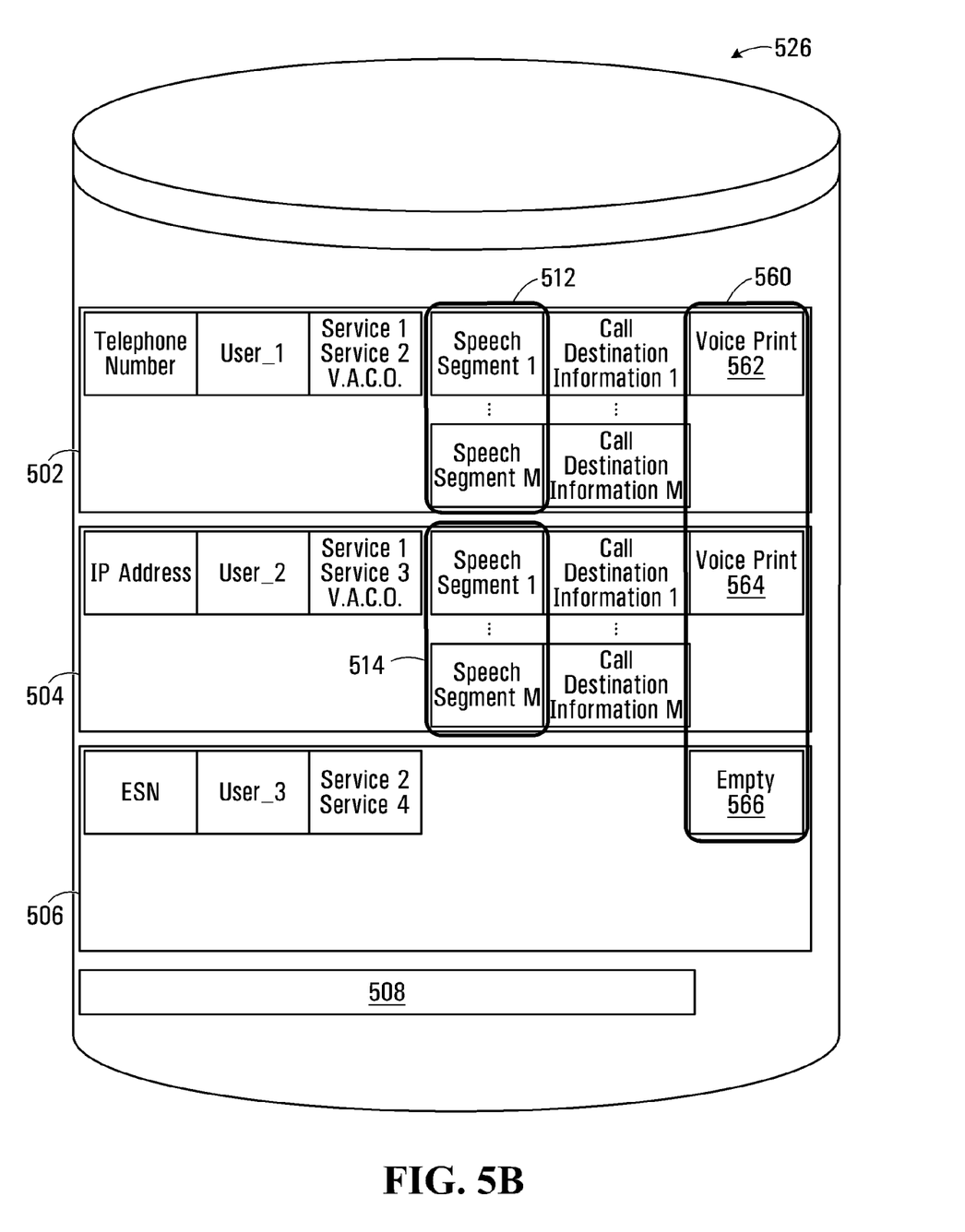
FIG. 5B is a variant of FIG. 5A.

To this end, as part of step 412 and with additional reference to FIG. 5B, the speech recognition module 36 may consult a new database 526, which stores biometric indicia (referred to as voice prints) for each of the users who subscribes to the voice-activated call origination service. To facilitate searching through the new database 526, there may be provided an additional area 560 in the new database 526 that stores voice prints for all users who subscribe to the voice-activated call origination service. In one non-limiting example embodiment, the area 560 in the new database 526 may comprise an additional field 562, 564, 566 of each of the records 502, 504, 506, which is searched during step 412. In the present non-limiting example, the additional fields 562, 564 associated with records 502, 504 contain voice prints for USER_1 and USER_2, respectively, whereas the additional field 566 associated with record 506 is empty because USER_3 does not subscribe to the voice-activated call origination service.

In a variant, there may be more than one detectable activation command, and some activation commands may be joint activation and origination commands. In this case, the signal 202 that contains the activation command is the same as the signal 212 that contains the call origination command. In addition, the joint activation and origination command may further comprise a recipient identifier from which call destination information can be derived.

For example, one possible joint activation and origination command, which includes a recipient identifier, may contain an utterance such as "phone on voice mail". Here, the call destination information is the telephone number of the voice mail system. In another example of a possible joint activation and origination command including a recipient identifier, there may be provided an utterance such as "phone on administration". Here, the call destination information is the identity of the controller 22, which allows the user 14 to change settings. Another example is "emergency emergency", which is unlikely to occur in ordinary parlance. Here, the call destination information includes the digits "0", "911" or whatever happens to be the appropriate emergency telephone number. Of course, a wide variety of other conceivable variants are within the scope of the present invention.

In another enhanced security variant of the above-described embodiments, it is within the scope of the present invention to reduce searching time even further by limiting the search for a matching voice print among only those users that are known, a priori, to potentially be associated with the communication device 12 (e.g., by sharing a common residence or by registering with the controller 22, etc.). This feature may of course be bypassed under certain circumstances, e.g., during after-hours to allow cleaning staff to call for help, and so on.

The various approaches to enhancing security as described above may be particularly useful to protect mobile users from abuse of their subscription to the voice-activated call origination service, especially in cases where users tend to migrate from one communication device to another or leave their devices unattended.

Thus, methods and systems for touch-free call origination have been described and illustrated. A call can be established without tactile interaction with the communication device 12. Moreover, the computational load on the communication device 12 is minimized, since it only needs to detect a small set of activation commands (with the larger set of call origination commands being detected in the controller 22). This may be advantageous in a wired or wireless device, as the infrequent occurrences of a detectable activation command in normal parlance will cause correspondingly infrequent accesses to the controller 22, with correspondingly infrequent depletion of resources along the access link 10. In wireless devices, the low computational complexity that is needed to search for this small set of activation commands has the added advantage of reducing the power consumption of the communication device 12.

Those skilled in the art will appreciate that in some embodiments, the functionality of one or more of the various aforementioned modules (e.g., the speech recognition module 48, the communication module 50, the communication module 34, the speech recognition module 36 and the control module 38) may be implemented as pre-programmed hardware or firmware elements (e.g., application specific integrated circuits (ASICs), electrically erasable programmable read-only memories (EEPROMs), etc.), or other related components. In other embodiments, one or more of the various aforementioned modules may be implemented as an arithmetic and logic unit (ALU) having access to a code memory (not shown) which stores program instructions for the operation of the ALU. The program instructions could be stored on a medium which is fixed, tangible and readable directly by the various aforementioned modules, (e.g., removable diskette, CD-ROM, ROM, USB drive or fixed disk), or the program instructions could be stored remotely but transmittable to the various aforementioned modules via a modem or other interface device (e.g., a communications adapter) connected to a network over a transmission medium. The transmission medium may be either a tangible medium (e.g., optical or analog communications lines) or a medium implemented using wireless techniques (e.g., microwave, infrared or other transmission schemes).

While specific embodiments of the present invention have been described and illustrated, it will be apparent to those skilled in the art that numerous modifications and variations can be made without departing from the scope of the invention as defined in the appended claims.

What is claimed is:

1. A method to enable touch-free call origination using a communication device equipped with a microphone, comprising:
processing a first portion of a microphone signal captured at the communication device in an attempt to detect a spoken activation command potentially contained therein, the first portion of the microphone signal processed at the communication device;
responsive to detection of a spoken activation command in the first portion of the microphone signal, establishing a communication path between the communication device and a network entity to convey to the network entity a second portion of the microphone signal captured at the communication device;
processing the second portion of the microphone signal at the network entity in an attempt to detect the call origination command potentially contained therein;
responsive to detection of a call origination command in the second portion of the microphone signal, attempting establishment of a call in accordance with the detected call origination command.

2. The method defined in claim 1, further comprising:
responsive to detection of a spoken activation command in the first portion of the microphone signal, sending a confirmation signal to the communication device over the communication path, the confirmation signal causing issuance of a confirmation request message by the communication device.

3. The method defined in claim 2, further comprising:
processing a third portion of the microphone signal at the network entity in an attempt to detect a confirmation response potentially contained therein;
responsive to detection of a negative confirmation response in the third portion of the microphone signal, disabling the communication path.

4. The method defined in claim 3, wherein said processing the third portion of the microphone signal occurs between said processing the first portion of the microphone signal and said processing the portion of the second microphone signal.

5. The method defined in claim 1, further comprising identifying at the network entity a user associated with the spoken activation command and performing at the network entity a determination of eligibility of the user to originate calls in a touch-free manner, wherein said establishing a communication path is performed only if said determination of eligibility is positive.

6. The method defined in claim 5, wherein said performing at the network entity a determination of eligibility of the user to originate calls in a touch-free manner comprises determining whether the user is subscribed to a voice-activated call origination service.

7. The method defined in claim 1, wherein the call origination command is spoken by a speaker, the method further comprising performing biometric signal processing on the second microphone signal to authenticate the speaker of the call origination command.

8. The method defined in claim 7, wherein said performing biometric signal processing comprises identifying voice characteristics of the second portion of the microphone signal and attempting to identify whether the identified voice characteristics match voice characteristics associated with at least one subscribed user in a database of subscribed users.

9. The method defined in claim 1, further comprising conveying a third portion of the microphone signal over the communication path.

10. The method defined in claim 9, further comprising performing biometric signal processing on the third portion of the microphone signal to authenticate the speaker of the spoken activation command.

11. The method defined in claim 10, wherein said performing biometric signal processing comprises identifying voice characteristics of the third portion of the microphone signal and attempting to identify whether the identified voice characteristics match voice characteristics associated with at least one subscribed user in a database of subscribed users.

12. The method defined in claim 11, the third microphone signal having been produced no earlier than the first portion of the microphone signal.

13. The method defined in claim 11, wherein said performing biometric signal processing on the third portion of the microphone signal occurs between said processing the first portion of the microphone signal and said processing the second portion of the microphone signal.

14. The method defined in claim 11, wherein the third microphone signal comprises at least a portion of the first microphone signal.

15. The method defined in claim 14, wherein said processing the second portion of the microphone signal at the network entity is performed only if the identified voice characteristics match voice characteristics associated with at least one subscribed user in the database of subscribed users.

16. A call origination unit for enabling touch-free call origination from a communication device, comprising:
a communication module adapted to support a communication path conveying a second portion of a microphone signal captured by a microphone associated with the communication device, the communication path being established in response to detection by the communication device of a spoken activation command in a first portion of the microphone signal;

a speech recognition module adapted to process the second portion of the microphone signal conveyed over the communication path in an attempt to detect a call origination command potentially contained therein;

a control module responsive to detection of the call origination command by the speech recognition module to attempt establishment of a call in accordance with the detected call origination command.

17. The call origination unit defined in claim 16, wherein the first portion of the microphone signal is produced prior to the second portion of the microphone signal.

18. The call origination unit defined in claim 17, wherein the call origination command conveys call destination information.

19. The call origination unit defined in claim 18, wherein the call destination information is a telephone number.

20. The call origination unit defined in claim 17, wherein the call origination command conveys a recipient identifier.

21. The call origination unit defined in claim 20, wherein the control module is further adapted to consult a database in order to determine call destination information corresponding to the recipient identifier.

22. The call origination unit defined in claim 16, wherein the speech recognition module is further adapted to compare the origination signal to a plurality of recognizable speech segments corresponding to different call destination information.

23. The call origination unit defined in claim 22, wherein the speech recognition module is further adapted to consult a database in order to access the plurality of recognizable speech segments corresponding to different call destination information.

24. The call origination unit defined in claim 16, the control module being adapted to (1) identify a user associated with the spoken activation command; (2) perform a determination of eligibility of the user to originate calls in a touch-free manner; and (3) establish the communication path in response to said determination of eligibility being positive.

25. The call origination unit defined in claim 24, wherein the control module being adapted to perform a determination of eligibility of the user to originate calls in a touch-free manner comprises the control module being adapted to determine whether the user is subscribed to a voice-activated call origination service.

26. The call origination unit defined in claim 25, wherein the call origination unit is reachable from the communication device via a communication network and wherein the communication path is established over a portion of the communication network.

27. The call origination unit defined in claim 26, wherein the communication device is connected to a telephone line, and wherein the control module being adapted to identify a user associated with the spoken activation command comprises the control module mapping an identity of the telephone line to the user.

28. The call origination unit defined in claim 26, wherein the communication device has an IP address, and wherein the control module being adapted to identify a user associated with the spoken activation command comprises the control module mapping the IP address to the user.

29. The call origination unit defined in claim 26, wherein the communication device has an electronic serial number, and wherein the control module being adapted to identify a user associated with the spoken activation command comprises the control module mapping the electronic serial number to the user.

30. The call origination unit defined in claim 16, wherein the communication module is further adapted to convey at least a portion of the first portion of the microphone signal over the communication path.

31. The call origination unit defined in claim 30, wherein the speech recognition module is further adapted to perform biometric signal processing on the at least a portion of the first portion of the microphone signal to authenticate the speaker of the spoken activation command.

32. The call origination unit defined in claim 31, wherein said speech recognition module being further adapted to perform biometric signal processing comprises said speech recognition module being further adapted to identify voice characteristics of the first portion of the microphone signal and to attempt to identify whether the identified voice characteristics match voice characteristics associated with at least one subscribed user in a database of subscribed users.

33. The call origination unit defined in claim 16, wherein the spoken activation command and the call origination command form a joint activation and origination command.

34. The call origination unit defined in claim 16, wherein the communication module is further adapted to send a confirmation signal over the communication path, the confirmation signal causing issuance of a confirmation request message by the communication device.

35. The call origination unit defined in claim 34, wherein the speech recognition module is further adapted to process a third portion of the microphone signal produced by the microphone, in an attempt to detect presence of a confirmation response potentially contained therein.

36. The call origination unit defined in claim 35, wherein the third portion of the microphone signal is conveyed over the communication path.

37. The call origination unit defined in claim 36, wherein the control module being adapted to attempt establishment of the call is conditional upon the speech recognition module not detecting presence of a confirmation response in the third portion of the microphone signal.

38. The call origination unit defined in claim 37, wherein the third portion of the microphone signal is produced between the first portion of the microphone signal and the second portion of the microphone signal.

39. The call origination unit defined in claim 37, wherein the third portion of the microphone signal is produced subsequent to the second portion of the microphone signal.

40. The call origination unit defined in claim 36, wherein the control module being adapted to attempt establishment of the call is conditional upon the speech recognition module detecting presence of a positive confirmation response in the third portion of the microphone signal.

41. The call origination unit defined in claim 40, wherein the third portion of the microphone signal is produced between the first portion of the microphone signal and the second portion of the microphone signal.

42. The call origination unit defined in claim 40, wherein the third portion of the microphone signal is produced subsequent to the second portion of the microphone signal.

43. The call origination unit defined in claim 36, wherein responsive to the speech recognition module detecting presence of a negative confirmation response in the third signal, the communication module is adapted to send a solicitation signal soliciting a new call origination command from a user of the communication device.

44. The call origination unit defined in claim 43, wherein the third portion of the microphone signal is produced subsequent to the second portion of the microphone signal.

45. A non-transitory computer readable storage medium containing a program element for execution by a call origination unit to enable touch-free call origination from a communication device, the program element including:
- program code means for supporting a communication path conveying a second portion of a microphone signal produced by a microphone associated with the communication device, the communication path being established in response to detection of a spoken activation command in a first portion of the microphone signal;
- program code means for processing the second portion of the microphone signal in an attempt to detect a call origination command potentially contained therein;
- program code means for, in response to detection of a call origination command, attempting establishment of a call in accordance with the detected call origination command.

46. A communication device for enabling touch-free call origination, comprising:
- a microphone adapted to produce a microphone signals indicative of sound sensed by the microphone;
- a speech recognition module adapted to process a first portion of the microphone signal in an attempt to detect a spoken activation command potentially contained therein;
- a communication module adapted to establish over a portion of a communication network a communication path with a call origination unit in response to detection of a spoken activation command by the speech recognition module, the communication path conveying a second portion of the microphone signal;
- wherein when the second portion of the microphone signal conveys a call origination command detectable by a second speech recognition module in the call origination unit, the call origination unit is caused to attempt establishment of a call in accordance with the call origination command.

47. The communication device defined in claim 46, being a wired POTS phone.

48. The communication device defined in claim 46, being a VoIP phone.

49. The communication device defined in claim 46, being a soft phone.

50. The communication device defined in claim 46, being a wireless phone.

51. A system for touch-free call origination, comprising:
- a communication device;
- a call origination unit reachable by the communication device via a portion of a communication network;
- the communication device comprising:
- a microphone adapted to produce a microphone signals indicative of sound sensed by the microphone;
- a first speech recognition module adapted to process a first portion of the microphone signal in an attempt to detect a spoken activation command potentially contained therein;
- a communication module adapted to convey a second portion of the microphone signal over a communication path established with the call origination unit in response to detection of a spoken activation command by the first speech recognition module;
- the call origination unit comprising:
- a second speech recognition module adapted to process the second portion of the microphone signal in an attempt to detect a call origination command potentially contained therein;
- control module responsive to detection of a call origination command by the second speech recognition module to attempt establishment of a call in accordance with the detected call origination command.

52. The system defined in claim 51, the control module being adapted to (1) identify a user associated with the spoken activation command; (2) perform a determination of eligibility of the user to originate calls in a touch-free manner; and (3) establish the communication path in response to said determination of eligibility being positive.

53. The system defined in claim 52, wherein said performing a determination of eligibility of the user to originate calls in a touch-free manner comprises determining whether the user is subscribed to a voice-activated call origination service.

\* \* \* \* \*